United States Patent [19]

Ohhashi et al.

[11] 4,363,107
[45] Dec. 7, 1982

[54] BINARY MULTIPLICATION CELL CIRCUIT

[75] Inventors: Masahide Ohhashi, Sagamihara; Hisao Yanagi, Yokohama, both of Japan

[73] Assignee: Tokyo Shibaura Denki Kabushiki Kaisha, Japan

[21] Appl. No.: 192,201

[22] Filed: Sep. 30, 1980

[30] Foreign Application Priority Data

Oct. 1, 1979 [JP] Japan .................................. 54-125316

[51] Int. Cl.$^3$ ............................................... G06F 7/52
[52] U.S. Cl. .................................... 364/758; 307/448; 307/472; 364/786
[58] Field of Search ....................... 364/757, 758, 786; 307/445, 448, 471, 472

[56] References Cited

U.S. PATENT DOCUMENTS 3,950,636  4/1976  Dao .................................... 364/758
4,293,922 10/1981  Davio et al. ....................... 364/757

OTHER PUBLICATIONS

Article Nikaido et al., *An N-MOS 16-bit Parallel Multiplier*, Dentsu Gakkai Gijutsu Kenkyu Hokoku, pp. 48–8 (SSD79-24) Jul. '79.

*Primary Examiner*—Jerry Smith
*Attorney, Agent, or Firm*—Finnegan, Henderson, Farabow, Garrett & Dunner

[57] ABSTRACT

A binary multiplication cell circuit suitable for a MOS transistor integrated circuit. The cell circuit has a NOR circuit for obtaining a partial product of one binary digit of a multiplicand and one binary digit of a multiplier and a full adder for obtaining result of multiplication (or augend) and a carry digit based on the partial product, an augend supplied from a given multiplication cell circuit and a carry digit supplied from another given multiplication cell circuit. The full adder comprises two AND circuits, three NOR circuits, an inverter and an exclusive OR circuit. Preferably, the exclusive OR circuit is constituted by an exclusive NOR circuit and an inverter.

2 Claims, 4 Drawing Figures

BINARY MULTIPLICATION CELL CIRCUIT

This invention relates to a binary multiplication cell circuit which may easily be formed of MOS transistors.

Computers achieve multiplication of binary numbers, as well as addition and subtraction of binary numbers. Binary multiplication is carried out usually in such way as shown in FIG. 1.

That is, a multidigit multiplicand $X_4 X_3 X_2 X_1$ is multiplied successively by the individual digits of a multidigit multiplier $Y_4 Y_3 Y_2 Y_1$. Blocks a shown in FIG. 1 correspond to individual multiplication cell circuits. Arrows extending downward represent addition, and arrows extending to the left indicate carry.

FIG. 2 illustrates input and output states of the multiplication cell circuit a. i and j are each anyone of integral numbers. Supplied to the cell circuit a are a multiplicand digit xi, a multiplier digit Yj, an augend Bi-1 obtained by a cell circuit immediately above the cell circuit a and a carry digit Ci-1 obtained by a cell circuit immediately right of the cell circuit a. The cell circuit a conducts the following arithmetic operations:

$$Ai = Xi \cdot Yj \quad (1)$$

$$Bi = Ai \oplus Bi\text{-}1 \oplus Ci\text{-}1 \quad (2)$$

$$Ci = Ai \cdot Bi\text{-}1 + Bi\text{-}1 \cdot Ci\text{-}1 + Ci\text{-}1 \cdot Ai \quad (3)$$

Thus each multiplication cell circuit a produces a partial product Ai, an augend Bi to be supplied to a cell circuit immediately below the cell circuit a and a carry digit Ci to be supplied to a cell circuit immediately left of the cell circuit a.

Arithmetic operations (1), (2) and (3) are carried out by logic circuits. The logic circuits may be constituted by two half-adders and one logic gate for producing a partial product Ai. If typical half-adders are used, the cell circuit a must be provided with more gates, namely more MOS transistors. In case the multiplication circuit is fabricated in the form of an LSI circuit, it is desired that each of its cell circuits should be comprised of as few gates as possible, namely as few MOS transistors as possible.

An object of this invention is to provide a binary multiplication cell circuit which has a decreased number of elements and which is therefore suitable for an integrated circuit version.

A binary multiplication cell circuit of this invention comprises a first NOR circuit for providing a partial product of one binary digit of a multiplicand and one binary digit of a multiplier, a first AND circuit connected to receive an output signal of the first NOR circuit and an augend, a second NOR circuit connected to receive the augend and an output signal of the first NOR circuit, a third NOR circuit connected to receive an output signal of the first AND circuit and an output signal of the second NOR circuit, an inverter for inverting a carry binary digit, a second AND circuit connected to receive an output signal of the inverter and an output signal of the third NOR circuit, a fourth NOR circuit connected to receive an output signal of the second AND circuit and the output signal of the second NOR circuit, and an exclusive OR circuit connected to receive the carry binary digit and the output signal of the third NOR circuit.

Preferably, the exclusive OR circuit is constituted by an exclusive NOR circuit and an inverter.

This invention can be more fully understood from the following detailed description when taken in conjunction with the accompanying drawings, in which.

Figure 1:
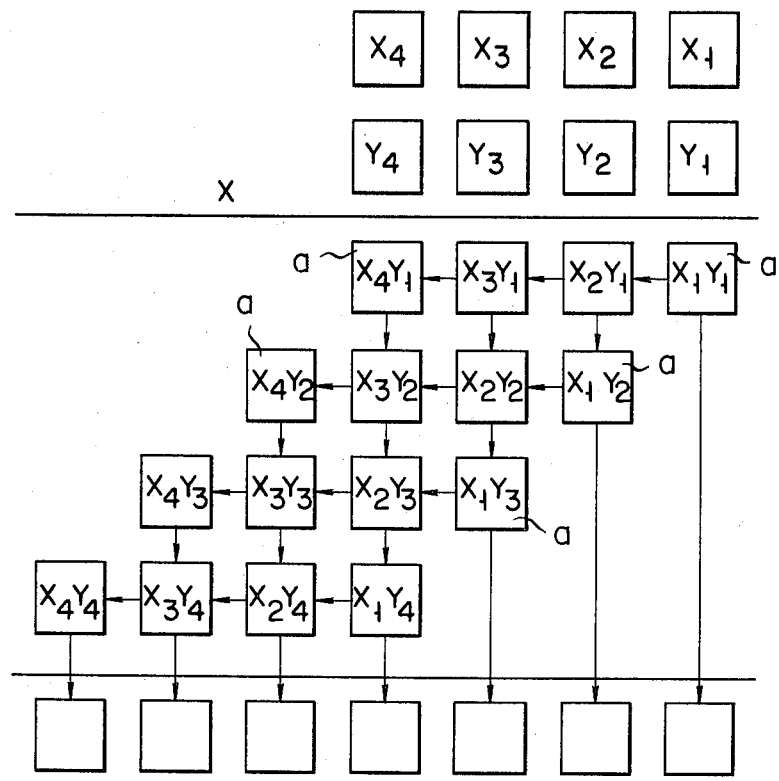
FIG. 1 illustrates how a binary multiplication is carried out.
Figure 2:
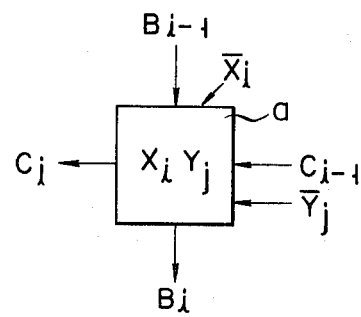
FIG. 2 shows input and output states of a multiplication cell circuit.

Now referring to FIG. 3, a binary multiplication cell circuit of this invention will be described. $\overline{Xi}$ designates a signal obtained by inverting each binary digit of a multiplicand, $\overline{Yj}$ a signal obtained by inverting each binary digit of a multiplier, Bi-1 an augend, Ci-1 a carry digit, Bi a result of multiplication (or augend to supply to the next binary multiplication cell circuit), and Ci a carry binary digit. The signal $\overline{Xi}$ is commonly supplied to the cell circuits $XiY_1$, $XiY_2$, $XiY_3$ and $XiY_4$ of FIG. 1. The signal $\overline{Yj}$ is commonly supplied to the cell circuits $X_1Yj$, $X_2Yj$, $X_3Yj$ and $X_4Yj$ of FIG. 1.

The signals $\overline{Xi}$ and $\overline{Yj}$ are supplied also to a NOR circuit 1, which produces a partial product $Ai$ ($= Xi \cdot Yj$) which is represented by equation (1). The partial product Ai and augend Bi-1 are applied to an AND circuit 2 and a NOR circuit 3. The AND circuit 2 produces Ai·Bi-1, and the NOR circuit 3 produces $\overline{Ai+Bi\text{-}1}$. These Ai·Bi-1 and $\overline{Ai+Bi\text{-}1}$ are applied to a NOR circuit 4, which provides Ai⊕Bi-1. Ai⊕Bi-1 and a carry digit Ci-1 from the preceding binary multiplication cell circuit (not shown) are supplied to an exclusive NOR circuit 5, which forms $\overline{Ai \oplus Bi\text{-}1 \oplus Ci\text{-}1}$. $\overline{Ai \oplus Bi\text{-}1 \oplus Ci\text{-}1}$ is inverted by an inverter 6 to produce Bi ($=Ai \oplus Bi\text{-}1 \oplus Ci\text{-}1$) represented in equation (2), i.e. an augend to be added to the next cell circuit or one binary digit of the product of the two binary numbers.

The exclusive NOR circuit 5 and the inverter 6 may be constituted by an exclusive OR circuit.

The carry digit Ci-1 from the preceding cell circuit is inverted by an inverter 7. The carry digit Ci-1 thus inverted and the output Ai⊕Bi-1 of the NOR circuit 4 are applied to an AND circuit 8, which produces a signal indicative of $(Ai \oplus Bi\text{-}1) \cdot \overline{Ci\text{-}1}$. This signal $(Ai \oplus Bi\text{-}1) \cdot \overline{Ci\text{-}1}$ and the output signal $\overline{Ai \oplus Bi\text{-}1}$ of the NOR circuit 3 are supplied to a NOR circuit 9, thereby producing a carry digit Ci to be added to the next binary multiplication cell circuit.

Carry digit Ci may be expressed as follows:

$$\begin{aligned}
Ci &= \overline{\overline{Ai} \cdot \overline{Bi} - 1 + Ai \cdot \overline{Bi} - 1 \cdot \overline{Ci} - 1 + \overline{Ai} \cdot Bi - 1 \cdot \overline{Ci} - 1} \\
&= \overline{\overline{Bi} - 1(\overline{Ai} + \overline{Ci} - 1) + \overline{Ai}(\overline{Bi} - 1 + \overline{Ci} - 1)} \\
&= \overline{\overline{Ai} \cdot \overline{Bi} - 1 + \overline{Ai} \cdot \overline{Ci} - 1 + \overline{Bi} - 1 \cdot \overline{Ci} - 1} \\
&= (Ai + Bi - 1)(Ai + Ci - 1)(Bi - 1 + Ci - 1) \\
&= Ai \cdot Bi - 1 + Bi - 1 \cdot Ci - 1 + Ci - 1 \cdot Ai
\end{aligned}$$

Figure 4:
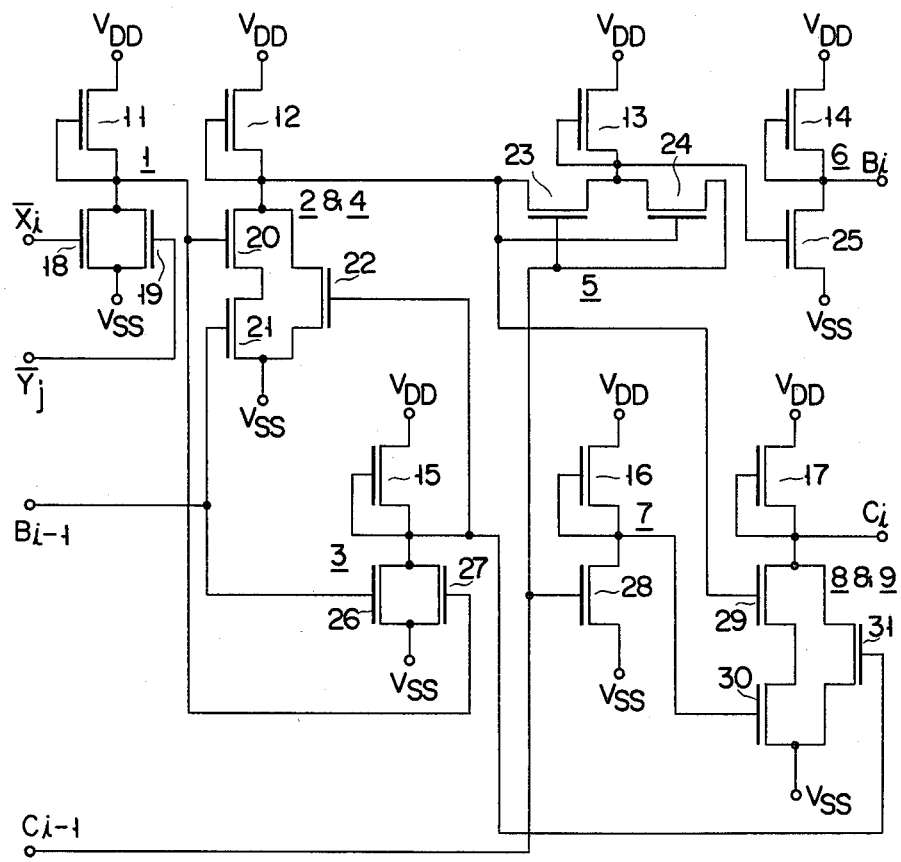
FIG. 4 shows a practical circuit arrangement of the binary multiplication cell circuit of FIG. 3 which is comprised of N-channel MOS transistors.

FIG. 4 is a circuit diagram of the binary multiplication cell circuit of FIG. 1, which is formed of N-channel insulated gate field effect transistors. The cell circuit comprises depletion load transistors 11 to 17 and enhancement transistors 18 to 31. The NOR circuit 1 is comprised of the transistors 11, 18 and 19, the NOR circuit 3 is comprised of the transistors 15, 26 and 27, the exclusive NOR circuit 5 is comprised of the transistors 13, 23 and 24, the inverter 6 is comprised of the transistors 14 and 25, and the inverter 7 is comprised of transistors 16 and 28. The AND circuit 2 and the NOR circuit 4 are constituted by the transistors 12, 20, 21 and 22. The AND circuit 8 and the NOR circuit 9 is comprised of the transistors 17, 29, 30 and 31.

Figure 3:
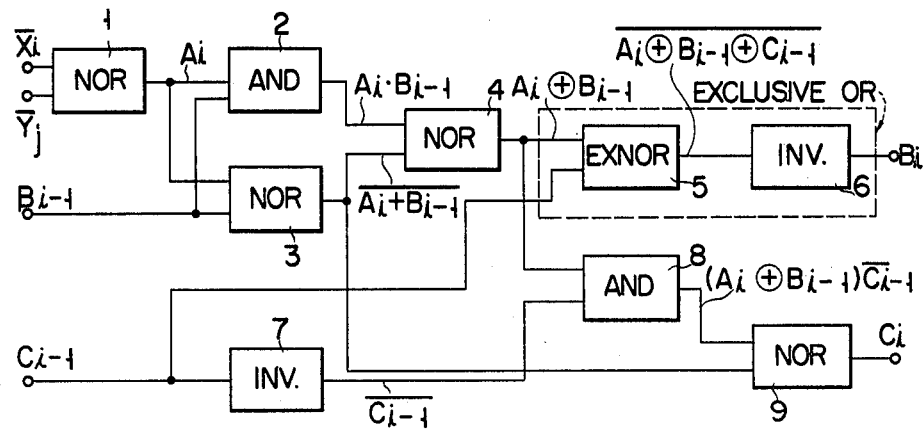
FIG. 3 is a block diagram of a binary multiplication cell circuit of this invention.

The circuit of FIG. 3, except for the NOR circuit 1 which produces a partial product Ai, constitutes a full adder. If a binary multiplication cell circuit is to be comprised of one NOR circuit for producing a partial product and two typical half-adders constituting a full adder, approximately 30 transistors will be required. By contrast, the binary multiplication cell circuit shown in FIG. 4 requires but 21 transistors.

In the above-mentioned embodiment of this invention the power dissipation can be reduced without using more transistors, only if the inverters 6 and 7 are replaced each by a two-transistor complementary inverter.

What we claim is:

1. A binary multiplication cell circuit comprising:

a first NOR circuit for providing a partial product of one binary digit of a multiplicand and one binary digit of a multiplier;

a first AND circuit connected to receive an output signal of said first NOR circuit and an augend;

a second NOR circuit connected to receive said augend and the output signal of said first NOR circuit;

a third NOR circuit connected to receive an output signal of said first AND circuit and an output signal of said second NOR circuit;

an inverter for inverting a carry binary digit;

a second AND circuit connected to receive an output signal of said inverter and an output signal of said third NOR circuit;

a fourth NOR circuit connected to receive an output signal of said second AND circuit and the output signal of said second NOR circuit; and an exclusive OR circuit connected to receive the carry binary digit and the output signal of said third NOR circuit.

2. A binary multiplication cell circuit according to claim 1, wherein said exclusive OR circuit is constituted by an exclusive NOR circuit and an inverter.